United States Patent
Bozenmayer

(12) 
(10) Patent No.: US 6,730,218 B2
(45) Date of Patent: May 4, 2004

(54) COUPLING DEVICE FOR CONNECTING A REPLACEABLE FILTER ELEMENT TO A CONDUIT

(75) Inventor: Kurt Bozenmayer, West Milford, NJ (US)

(73) Assignee: Graver Technologies, Inc., Glasgow, DE (US)

( * ) Notice: Subject to any disclaimer, the term of this patent is extended or adjusted under 35 U.S.C. 154(b) by 0 days.

(21) Appl. No.: 09/841,650

(22) Filed: Apr. 24, 2001

(65) Prior Publication Data

US 2002/0153297 A1 Oct. 24, 2002

(51) Int. Cl.[7] .......................... B01D 27/00; B01D 27/14; B01D 29/33
(52) U.S. Cl. ............... 210/232; 210/323.2; 210/333.01; 285/361; 285/376
(58) Field of Search .............................. 210/232, 323.2, 210/333.01; 285/361, 376

(56) References Cited

U.S. PATENT DOCUMENTS

| | | | | |
|---|---|---|---|---|
| 196,104 A | * | 10/1877 | Addison | |
| 3,218,785 A | * | 11/1965 | Tietz | |
| 3,279,608 A | | 10/1966 | Soriente et al. | |
| 3,319,793 A | | 5/1967 | Miller, Jr. et al. | |
| 3,356,226 A | | 12/1967 | Miller, Jr. et al. | |
| 3,502,221 A | * | 3/1970 | Butterfield | |
| 3,513,980 A | | 5/1970 | Masaschi et al. | |
| 3,615,016 A | * | 10/1971 | Soriente et al. | |
| 3,624,779 A | | 11/1971 | Miller, Jr. et al. | |
| 3,760,951 A | * | 9/1973 | Mansfield | |
| 3,858,910 A | * | 1/1975 | Oetiker | |
| 4,210,537 A | * | 7/1980 | Butterworth et al. | |
| 4,420,396 A | * | 12/1983 | Yamamoto et al. | |
| 4,495,072 A | * | 1/1985 | Fields | |
| 4,707,257 A | | 11/1987 | Davis et al. | |
| 4,728,423 A | * | 3/1988 | Kuwajima | |
| 5,045,192 A | * | 9/1991 | Terhune | |
| 5,346,624 A | | 9/1994 | Libutti et al. | |
| 5,667,679 A | | 9/1997 | Bozenmayer et al. | |
| 5,882,511 A | | 3/1999 | Blomquist | |

FOREIGN PATENT DOCUMENTS

| | | | |
|---|---|---|---|
| EP | 231862 | * | 8/1987 |
| EP | 830885 | * | 3/1998 |
| FR | 2127360 | * | 10/1972 |
| JP | 04-302797 | * | 10/1992 |

* cited by examiner

*Primary Examiner*—Thomas M. Lithgow
(74) *Attorney, Agent, or Firm*—Piper Rudnick LLP

(57) ABSTRACT

A coupling device for connecting a filter element to a fluid conduit has a male coupling secured to either the fluid conduit or the filter element. The male coupling also has at least two radially projecting tabs. A polymeric female coupling engages with the male coupling for securing the filter element on the fluid conduit. The female coupling also has lands for receiving the tabs. The male and female couplings each have a passageway for fluid and that generally defines an axial direction. Each tab is configured for distributing an axial force generally throughout the tab and laterally relative the axial direction so that either the land being forced against the tab or the tab being forced against the land does not damage the female coupling and as long as the filter element remains secured to the fluid conduit.

14 Claims, 9 Drawing Sheets

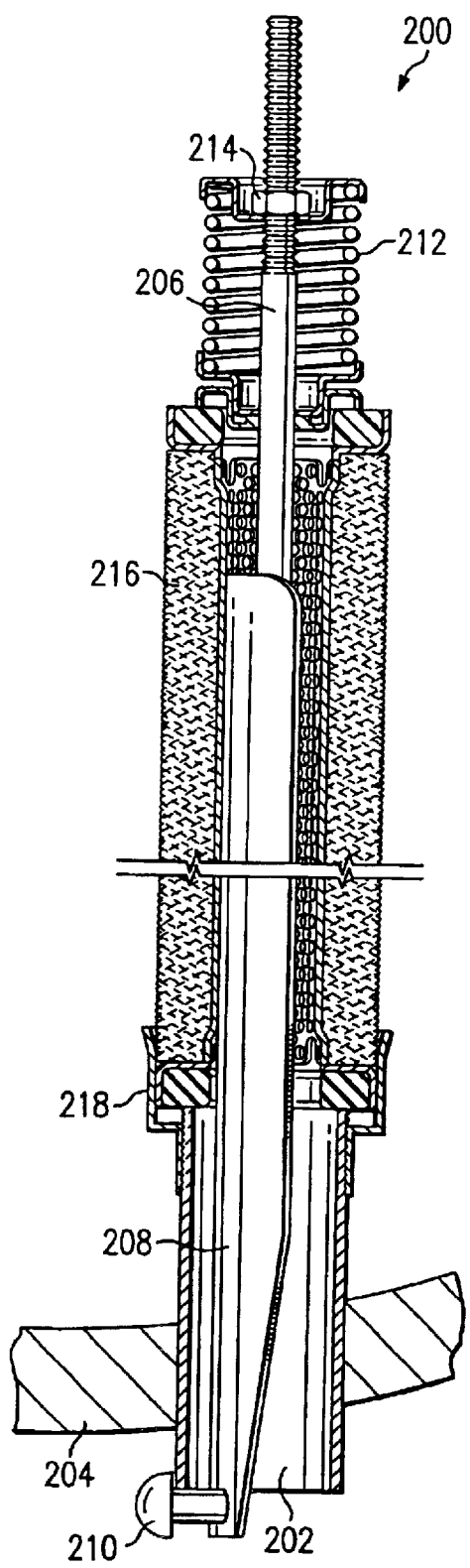
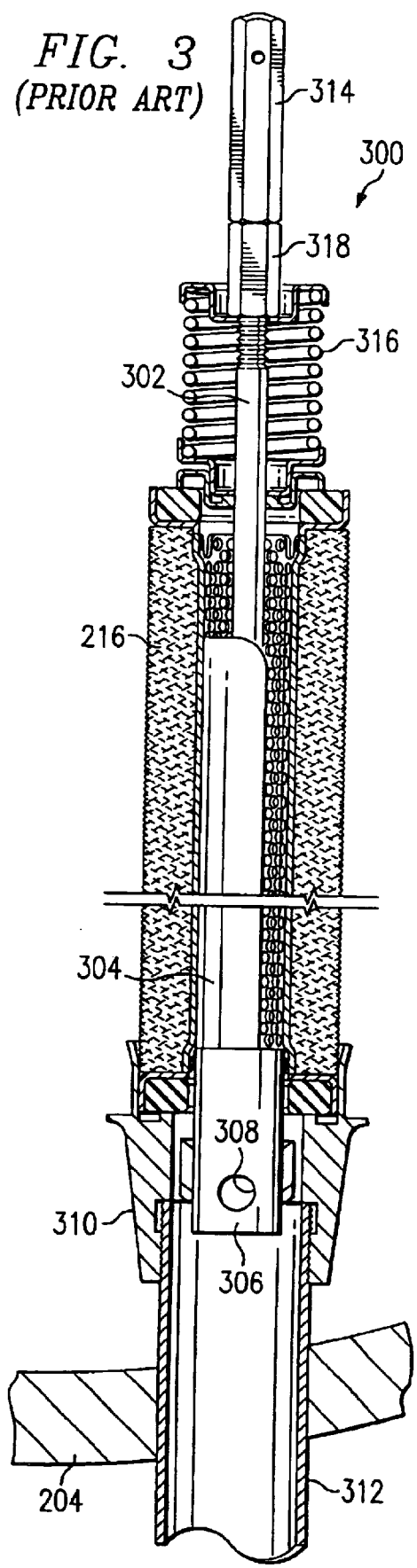
FIG. 2 (PRIOR ART)
FIG. 3 (PRIOR ART)

US 6,730,218 B2

COUPLING DEVICE FOR CONNECTING A REPLACEABLE FILTER ELEMENT TO A CONDUIT

TECHNICAL FIELD

The invention relates generally to filter cartridges for filter vessels in fluid purification systems, and more particularly to coupling devices that connect replaceable filter cartridges to outlet tubes in filter vessels for purification of radioactive or other hazardous fluids.

BACKGROUND OF THE INVENTION

Power plants and other facilities with fluid purification processes frequently have filter tanks or filter vessels to purify a variety of different liquids or gases, such as fluid fossil fuels, or radioactive steam or water at nuclear power plants. Known filter vessels have an inlet supplying a fluid to a main filtration chamber holding a number of tubular filters. Long tubes support and act as the core for the tubular filters. These long tubes extend from a tube sheet that separates the main chamber from a plenum for holding purified fluid. An outlet leads from the plenum to the exterior of the filter vessel.

In conventional practice, on the opposite end of the filters from the tube sheet, separate mount assemblies use compression to secure the filters to the tubes while sealing that end of the tube. Since the mount assemblies contain numerous parts, these parts frequently fall into the filter vessel while disassembling the mount assembly to replace the filters. Parts falling into the vessel must be removed to prevent damage to filter elements caused by motion of the loose parts during service flow, and in nuclear powered generating plants, Nuclear Regulatory Commission oversight mandates the retrieval of the loose parts. Regardless of the application, if loose parts cannot be located and removed with suitable "fishing" tools, filter elements must be removed to permit access to the vessel to retrieve the loose parts. U.S. Pat. No. 5,667,679 to Bozenmayer et al. attempts to solve this problem by providing a mount assembly that is removed quickly without losing parts. This design, however, is made of stainless steel parts that are difficult to dispose or recycle when radioactive.

Referring to FIG. 1, another conventional filter vessel 100 has an inlet 102 that delivers unpurified, typically pressurized, fluids to a main chamber 104. The arrows F indicate direction of flow for the fluid during normal operations.

The fluid enters replaceable filter cartridges 106, as known in the art, and through known tubular filters contained thereby that remove unwanted particulate or foreign matter. The purified fluid then flows downward through tubes or pipes 108 that open up into a plenum 110. The plenum is separated from the main chamber 104 by a stainless steel false bottom or tube sheet 112 conventionally welded to the tubes 108. The fluid then exits the filter vessel 100 through an outlet 114. Conventional filter vessels 100 typically vary in diameter from six inches to seven feet (and three foot to eight foot heights) depending on the quantity and size of filter elements contained therein. Vessels are known to accommodate anywhere from two to over 1000 filter cartridges.

Some conventional filter cartridges 106 are held in place by a hold down plate 116 as known in the art. The filter cartridges 106 are single open-ended with a closed top and a protruding bolt, post, rod or other connector 118 to extend upward through a hole in the hold down plate 116 for lateral support and to maintain distances between adjacent filter cartridges. The hold down plates 116 are usually bolted to the perimeter of the vessel or secured to the bottom by long connecting rods (not shown). Either mechanism provides downward force to seal the cartridges 106 to the tube sheet 112. Cartridges 106 that are held down by hold down plates 116 typically have a spigot that fits into holes in the tubesheet 112, and is sealed with either a flat gasket or one or more O-rings (not shown).

Some filter cartridges 106 have threaded bottoms for securing the filter cartridge to the tubesheet 112 and affecting a liquid tight seal, which does not require a hold down plate. However, a steel threaded lower end (not shown) must be rotated numerous times by robot, hand, wrench, other special tool or automatic mechanism to thread each filter cartridge 106 onto one of the tubes 108.

Since a filter cartridge 106 that is threaded requires numerous turns, a worker or mechanism must use a relatively long amount of time to unscrew an old filter cartridge from the end of the tube 108 and then screw a new filter cartridge 106 back onto the tube. When radioactive or hazardous materials are being purified, the longer it takes to replace a filter cartridge, the longer a person or tool is exposed to the dangerous environment. Thus, when special tools are used, frequent replacement is required which is expensive. Alternatively, when a worker is required to replace a filter cartridge by placing his gloved hand in the vessel to turn the filter cartridge, the filter replacement may take a long period of time relative to a safe maximum exposure time available to a single worker. Limited by the maximum safe time periods, changing a filter either requires a number of workers taking turns, which raises labor costs, or requires a single worker to take breaks to reduce the exposure levels obtained in a single period, which is time consuming. Otherwise, the worker may feel encouraged to complete filter replacements within an unsafe period of time.

As shown in FIG. 2, an improvement over the threaded filter cartridge is a guide rod and hook design used to mount a filter cartridge 200 onto a tube 202 welded to a tube sheet 204 such as an Aegis™ Fossil Assembly as is known in the art. The filter cartridge 200 has a guide rod 206 welded to a plate 208 with an end with a hook (as disclosed in U.S. Pat. No. 3,279,608 to Soriente et al.), or in the illustrated case, a rivet 210, to latch on the end of the tube 202. A coil spring 212 and nut 214 are used to seal the top of the filter 216 while compressing the filter cartridge 216 against the tube 202 and to hold it in place against an adapter 218 threaded permanently to the tube 202.

The upper end of the guide rod 206 is used to attach to a positioning lattice (not shown) for lateral stabilization. This design, however, still requires the unthreading of the nut 214 to remove the filter cartridge 200 from the tube 202, and the rivet hook is not considered of adequate strength for high pressure and highly corrosive nuclear power plant applications.

Referring to FIG. 3, in a similar manner as filter cartridge 200, filter cartridge 300 has a guide rod 302 welded to a plate 304. However, the plate 304 has a tubular connector pipe 306 with two opposing holes 308 (only one is shown) that receives a pin (not shown). The pin is permanently press-fit into connector pipe 306 before the filter cartridge 300 is placed on a tubesheet tube 312 within the vessel. Connector pipe 306, with the pin attached, is inserted downward through slots in adapter 310 which is previously attached to the tubesheet tube 312. The connector pipe is pressed downward against tension from a top spring, and is rotated 60 to 90 degrees in either direction to engage cam slots (not shown) on the inside of the adapter 310. The pin is not removed separately, but remains with connector pipe 306 and guide rod 302, and the entire assembly is removed by pressing downward against spring compression and rotating until the pin ends pass upward through the slots in adapter 310.

The top post 314 and mount assembly 316 are also similar to corresponding structures in filter cartridge 200. While this design (named an Aegis™ Nuclear Assembly ) provides two places of contact (two holes) on the tube 312, the pin blocks the interior of the tube 314 reducing the flow cross-section within the tube 312.

Some of the problems of the threaded and guide rod filter cartridges have been addressed by the Ecolock™ system by Graver Technologies. Referring to FIG. 4, the filter cartridge 400 has an adapter 402 threaded to a filter vessel tube (not shown) on a tube sheet (not shown). Prior to placement of the cartridge 400 within the vessel, an extension pipe 404 has an upper end threaded to a filter 406. To place the cartridge 400 within the vessel, a lower end of the extension pipe 404 is inserted over the adapter 402. The extension pipe 404 has a snap ring 408 for securing to a groove on the adapter. The top of the filter 406 has a post 410 for attaching to a positioning lattice (not shown) and aiding in compressing the cartridge 400. A spring assembly 412 is located within the extension pipe 404 for maintaining tension in the filter-to-extension pipe connection and adapter-to-extension pipe connection that further maintains the filter cartridge 400 in place. A passage 414 is provided from the center of the filter 406, through the spring 412, extension pipe 404 and adapter 402, to the filter vessel tube (not shown).

For removal of the Ecolock™ filter cartridge 400, the filter cartridge and associated hardware is rotated 90 degrees, which disengages the snap ring 408 from adapter 402. The spring then assists in ejecting the filter cartridge and hardware assembly in a very expedient manner. However, the Ecolock™ hardware design is very expensive and assembly procedures should include extra measures to ensure that the assembly is in fact locked into place within the vessel since this can be difficult to determine sometimes. If the Ecolock™ assembly is not latched correctly during installation, premature unlatching can occur during operation of the vessel.

Another known filter cartridge and filter vessel eliminates the need for threading the filter cartridge to a tube on a tube sheet. As shown on FIGS. 5A–5D, a filter cartridge 500 has a steel adapter 502 that connects a filter 504 to a stainless steel filter vessel tube 506. As shown in FIGS. 5C–5D, a spring 508 applying forces of 50–60pounds is located between a support ring 510 welded to the exterior of the tube 506 and two pins 512 also welded to the exterior of the tube 506. Referring to FIGS. 5B and 5C, the adapter 502 has two opposing slots 514 (only one shown) for receiving the pins 512 and has an annular groove 516 that slides over the pins as the adapter is rotated about the tube 506. Once the adapter is rotated 90° as shown in FIG. 5D, the pins 512 are positioned in two opposing locking apertures 518.

In order to position a filter cartridge 500 on the tube 506, the filter cartridge must be pushed downward (axially) to engage the pins 512 and spring 508, and then rotated a full ninety degrees to place the pins in the locking apertures 518. The spring 508 biases the adapter 502 upward to hold the pins 512 against the bottoms 520 of the locking apertures 518, which further stabilizes and secures the filter cartridge 500 on the tube 506.

In some nuclear power plant filter vessel applications, during backwashing (fluid flow in the upward direction on FIGS. 5A–5D) the spring and fluid can combine to form an axial force of approximately 100 pounds that impacts the filter cartridge 500. The adapter 502 must be made of steel to withstand this force, which is transmitted through the circular pins 512. Otherwise, the high axial forces will cause the pins 512 to rip through an adapter 502 made of a weaker material such as plastic and disengage the filter cartridge 500 during backwashing operations.

Radioactive steel hardware, however, is dangerous, difficult and expensive to handle when replacing filter cartridges. Steel hardware cannot be recycled or incinerated using present technology. If hardware is to be separated and re-used with new filter cartridges, significant operator exposure to radiation occurs during disassembly and re-assembly. For this reason alone, the hardware is often replaced rather than re-used. The discarded hardware that is disposed of as radioactive waste will incur a disposal cost ten times or more its initial cost. Even though certain steels might be reusable after 18 months to six years, usually hardware that is "buried" as radioactive waste remains buried forever.

SUMMARY OF THE INVENTION

In keeping with one aspect of the present invention, a coupling device is able to provide a recyclable thermoplastic female coupling on a filter element for engaging a steel male coupling on a fluid conduit by using tabs on the steel male coupling that reduce the impact of forces on the thermoplastic coupling. This is accomplished by spreading out an axial force laterally along flat surface areas of the tabs that engage lands on the female coupling. With this configuration, the tabs impact the lands along a flat surface rather than merely at a single point, which occurs when a cylindrical pin is used as in the known filter adapters.

More specifically, a coupling device for connecting a filter element to a fluid conduit has a male coupling secured to either the fluid conduit or the filter element. The male coupling also has at least two radially projecting tabs. A polymeric female coupling engages with the male coupling for securing the filter element on the fluid conduit. The female coupling also has lands for receiving the tabs. The male and female couplings each have a passageway for fluid that generally defines an axial direction. Each tab is configured for distributing an axial force generally throughout the tab and laterally relative the axial direction so that either the land being forced against the tab or the tab being forced against the land does not damage the female coupling and the filter element remains secured to the fluid conduit In another aspect of the present invention, a coupling device for connecting a filter element to a fluid conduit has a male coupling with at least two radially extending tabs, and a substantially polymeric female coupling with a land for engaging each tab. The female coupling defines an axis, a circumference and an axially extending access channel continuous with a circumferentially extending land channel receiving one of the tabs. Each land defines a surface of the land channel, and the access channel is configured and disposed on the female coupling so that each access channel receives one tab. Either the access channels are moved axially over the tabs or the tabs are moved axially through the access channels in order to place the tabs within the land channels.

In yet another aspect, a coupling device for connecting a filter element to a fluid conduit has a first coupling with an exterior surface of rotation and at least two tabs projecting generally radially from the exterior surface. The first coupling also defines a passageway for fluid and an axial direction. Each tab has a flat mating surface with a predetermined surface area for distributing an axial force generally throughout the mating surface and laterally relative to the axial direction.

In a further part of the present invention, a female coupling for connecting a fluid element to a fluid conduit has a polymeric body with a land for receiving a projection at a fully secured position. The female coupling defines an axis, a circumference and an axially extending access channel continuous with a circumferentially extending land channel. The land defines a surface of the land channel.

The present invention is also directed to a coupling device for connecting a filter element to a fluid conduit that has a polymeric filter-side coupling attached to the filter element, and a conduit-side coupling attached to the fluid conduit and engaging the filter-side coupling. A selected one of the filter-side coupling and the conduit-side coupling has at least two radially projecting tabs, and the corresponding other coupling has lands for receiving the tabs. The filter-side coupling receives an axial force causing the lands and the tabs to press against each other. The filter-side coupling also has either the lands or the tabs configured for generally distributing the axial force throughout the land or the tab laterally relative to the axial direction so that the filter-side coupling is not damaged by the axial force.

In similar terms, the present invention has a quick-connect coupling device for connecting a filter element to a fluid conduit. The device has a male coupling with generally radially projecting tabs, and a polymeric female coupling with lands for mating with the tabs. One of the couplings is part of the filter element, and the couplings are configured so that they are fully engaged with each other with at most a single twist of a gripping mechanism (robotic mechanism or the like) or human hand grasping the filter element.

The flat tabs also allow for quick placement or removal of the filter element because the tabs merely require a twist of one-sixth of a full 360 degree turn or about 60 degrees, in order to fully secure the couplings or to completely disconnect the couplings. In more detail, a method of rapid installment of a filter element on a fluid conduit has the steps of, with a gripping mechanism or human hand grasping the end of a filter element, moving the filter element axially for engaging a polymeric female coupling on a selected one of the filter element and the fluid conduit with a male coupling on the corresponding opposite one of the filter element and the fluid conduit. One of the couplings is a part of the filter element. Twisting a selected one of the female coupling and the male coupling on the filter element fully engages the fluid conduit coupling without releasing and re-grasping the filter element.

BRIEF DESCRIPTION OF THE DRAWINGS

The above mentioned and other features of this invention and the manner of obtaining them will be apparent, and the invention itself will be best understood, by reference to the following description of illustrated embodiments of the invention in conjunction with the drawings, in which like characters identify like parts and in which:

FIG. 2 is a cross-sectional side view of a first filter cartridge to outlet tube connection as known in the art;

FIG. 3 is a cross-sectional side view of a second filter cartridge to outlet tube connection as known in the art;

DETAILED DESCRIPTION OF THE INVENTION

Figure 1:
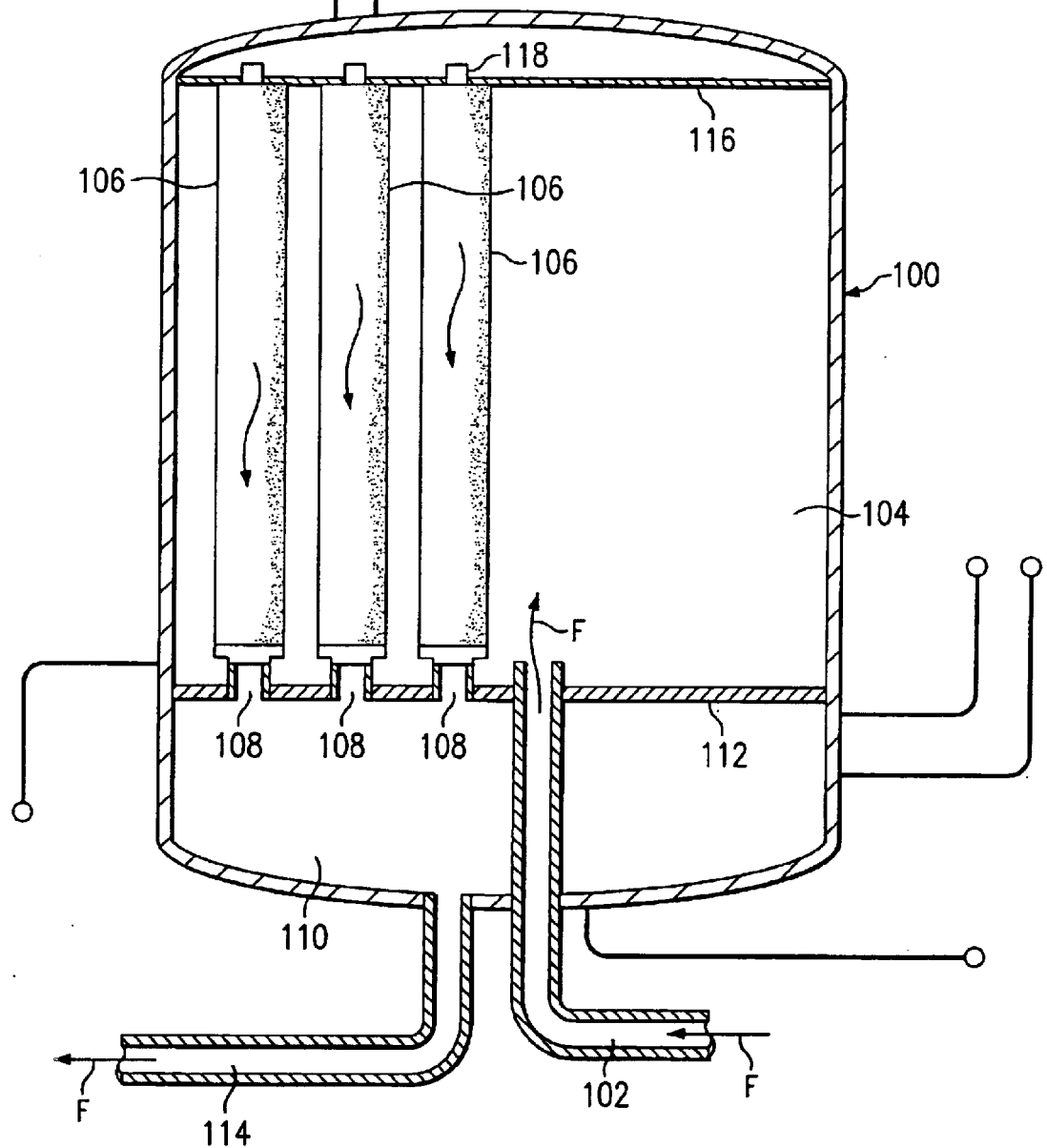
FIG. 1 is a cross-sectional side view showing components of a filter vessel as known in the prior art.
Figure 4:
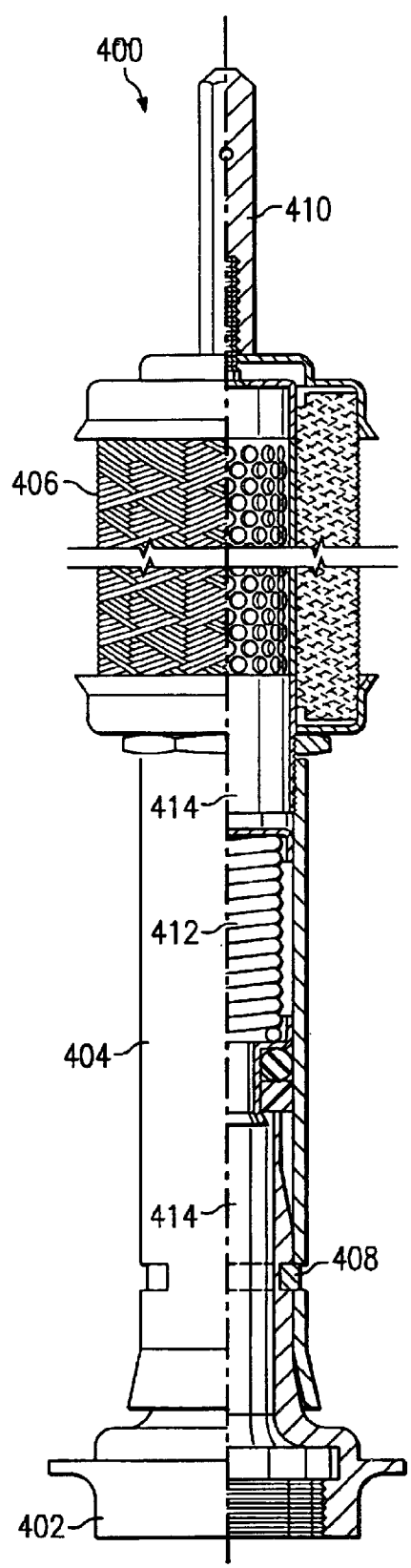
FIG. 4 is a part-elevational, part cross-sectional side view of a third filter cartridge to outlet tube connection as known in the art.
Figure 5A:
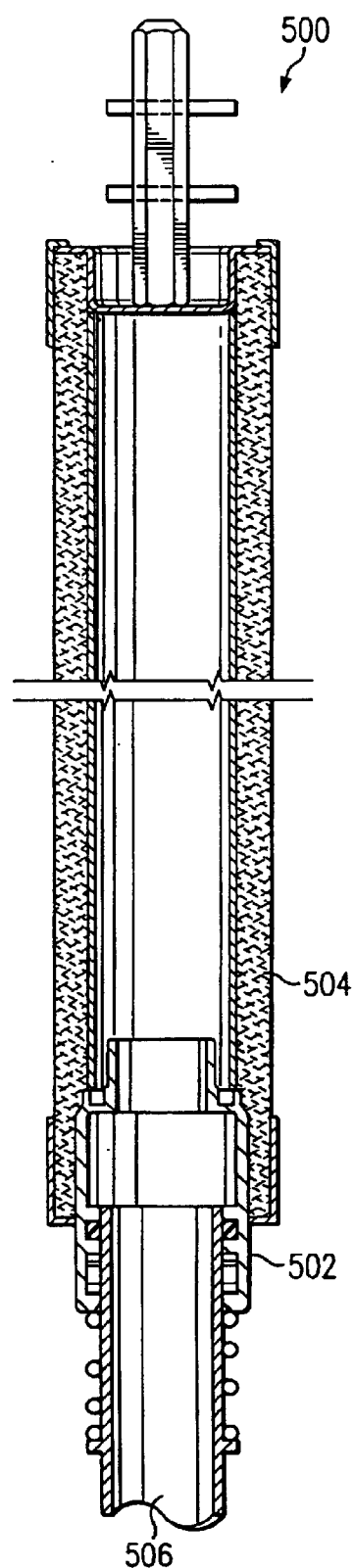
FIG. 5A is a cross-sectional side view of a fourth filter cartridge to outlet tube connection as known in the art.
Figure 5B:
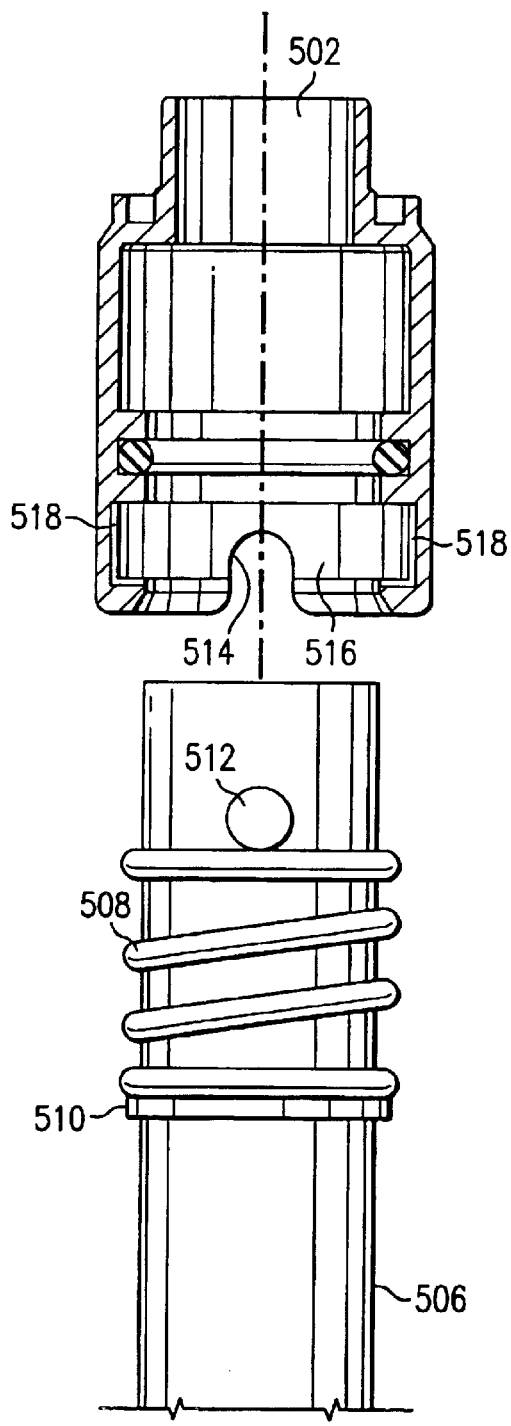
FIG. 5B is an exploded side view of a coupling device for the fourth filter cartridge as known in the art.
Figure 5C:
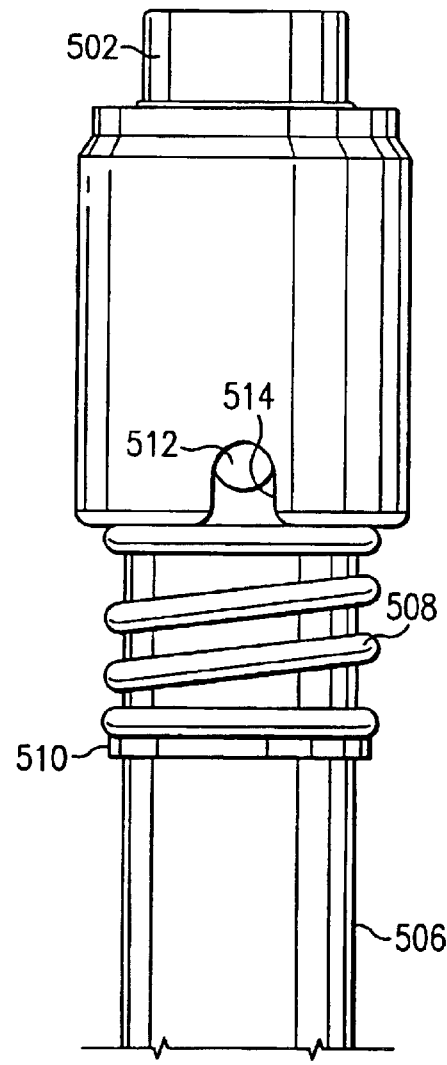
FIG. 5C is an assembled side view of the coupling device known in the art.
Figure 5D:
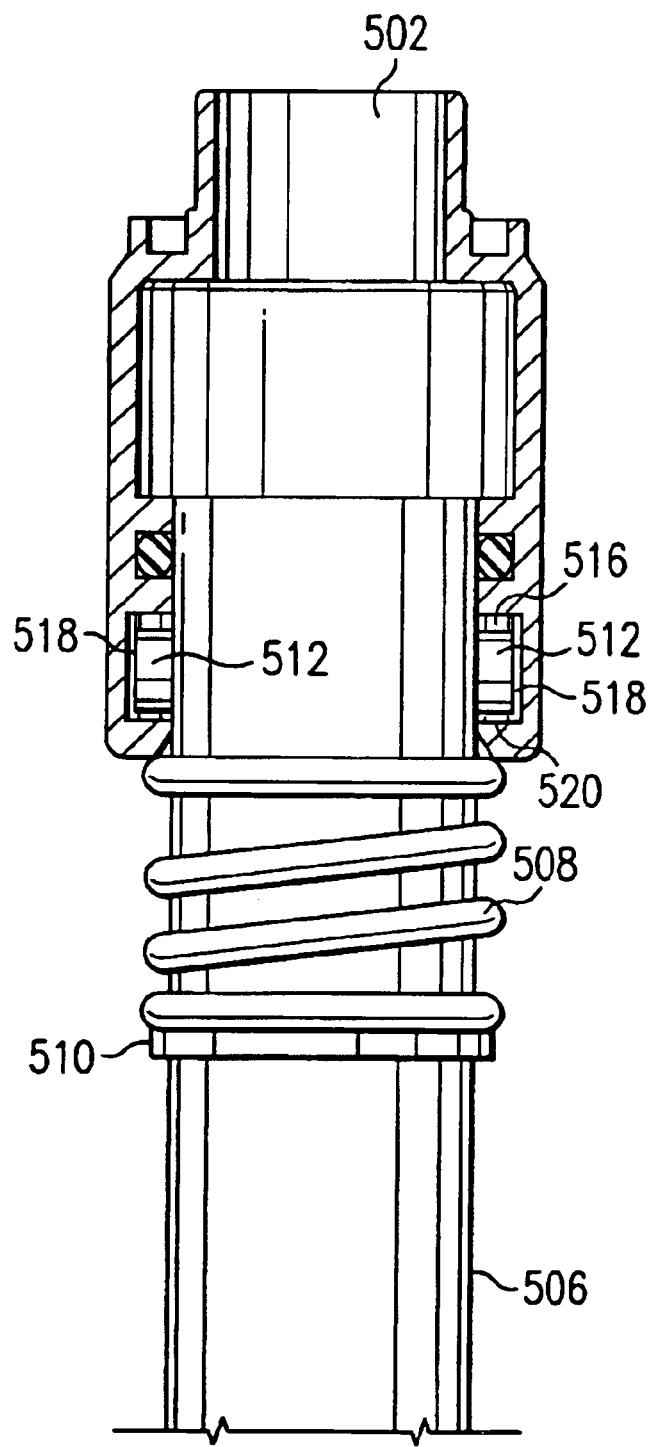
FIG. 5D is another assembled side view of the coupling device known in the art with an upper portion of the coupling turned ninety degrees.
Figure 6:
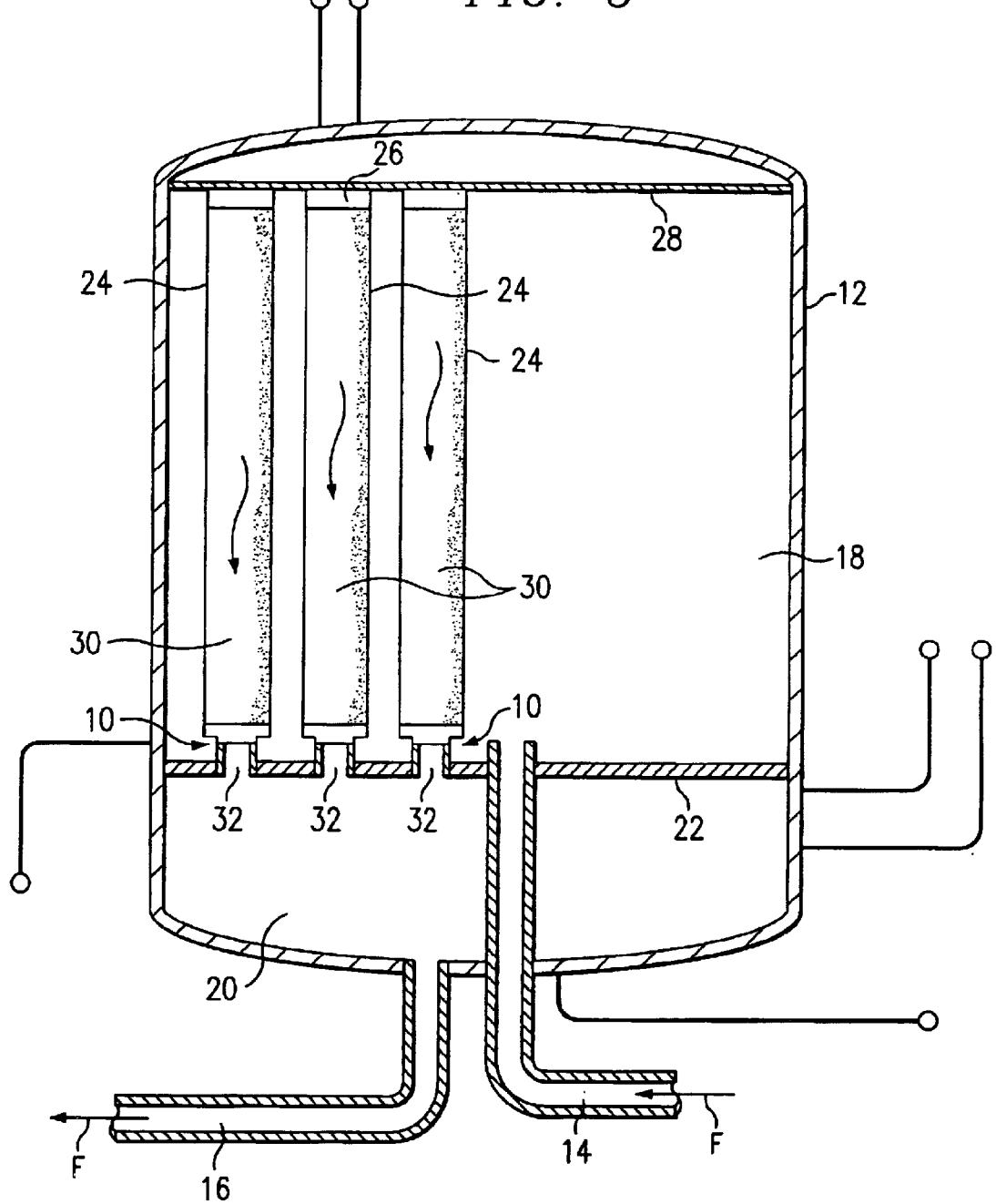
FIG. 6 is a cross-sectional side view showing components of a filter vessel in accordance with the present invention.

Referring to FIG. 6, a filter vessel 12 has a fluid inlet 14, an outlet 16, a main filtration chamber 18 and a plenum 20 separated from the main chamber by a tube sheet or false bottom 22. While the filter vessel 12 is shown holding three filter elements or cartridges 24, it will be appreciated that filter vessels are designed to hold anywhere from a single filter cartridge to thousands of filter cartridges depending on the particular filtration requirements of the fluid system.

Each filter cartridge 24 has a top portion 26, preferably designed to be free standing, but alternatively supported laterally and/or vertically by a hold down plate or positioning lattice 28 (shown in dashed line) as known in the art. This may include a hold down plate or positioning lattice 28 with spaced dimples (not shown) to mate with indents (not shown) on the top portion 26 of the filter cartridges 24, or posts or bolts (not shown) may extend from the top portion 26 to be inserted through holes in the hold down plate or positioning lattice 28 as known in the art.

Each filter cartridge 24 holds a tubular filter 30, as known in the art, that includes yarn and/or pleated non-woven membrane surrounding a perforated core. The filters 30 also have thermoplastic, preferably polypropylene, parts to hold the top and bottom ends of the filter 30.

Figure 7:
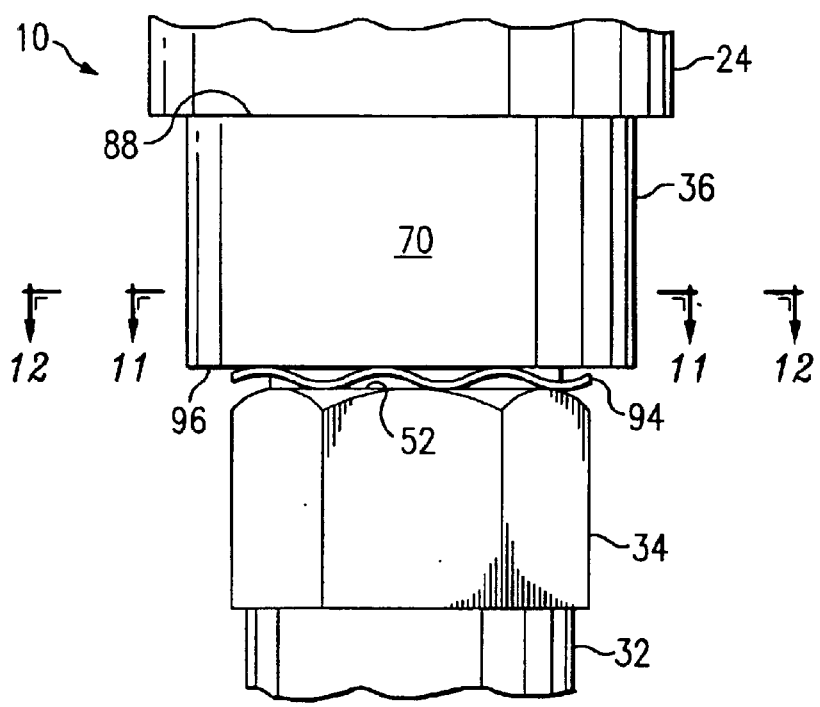
FIG. 7 is an elevational view of the coupling device in accordance with the present invention.

Referring now to FIG. 7, a coupling device 10 according to the invention mounts each filter cartridge 24 onto a steel filter conduit or tube 32 integrally formed with, or welded to, the tube sheet 22. Each coupling device 10 includes a preferably stainless steel adapter or male coupling 34 and a polymeric socket or female coupling 36 which is a part of the filter cartridge 24. The adapter 34 is permanently attached to the tube 32, as explained below. It will be appreciated that the adapter 34 may be made of any corrosion-resistant material of suitable strength as long as it is compatible with the hazardous or radioactive environment of the fluid process. Polymeric materials suitable for forming the female coupling 36 include thermoplastic and thermosetting plastics, polymers and resins that have sufficient structural strength to withstand, in the structures shown, at least 70 to 100 pounds in axial force without shearing, tearing or otherwise failing. A particularly preferred material includes injection molded polypropylene.

Figure 8:
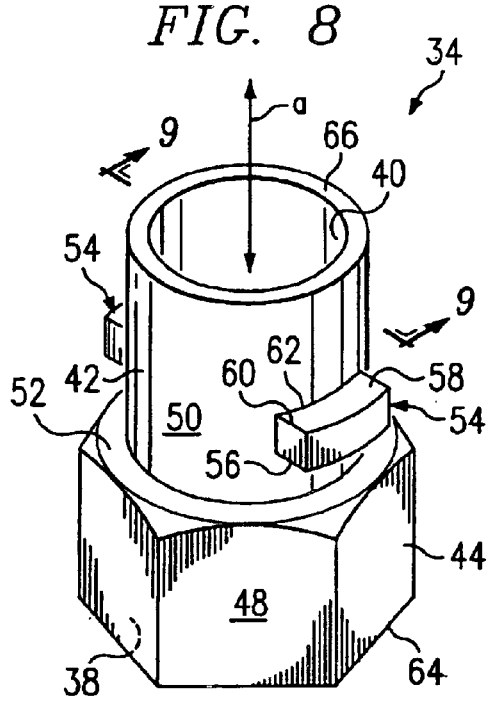
FIG. 8 is a top and side isometric view of an adapter portion of the coupling device in accordance with the present invention.
Figure 9:
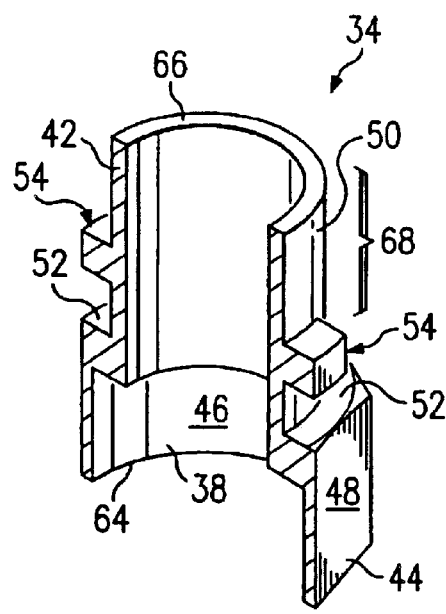
FIG. 9 is a top and side cross-sectional isometric view taken substantially along line 9—9 in FIG. 8 of the adapter portion in accordance with the present invention.
Figure 10:
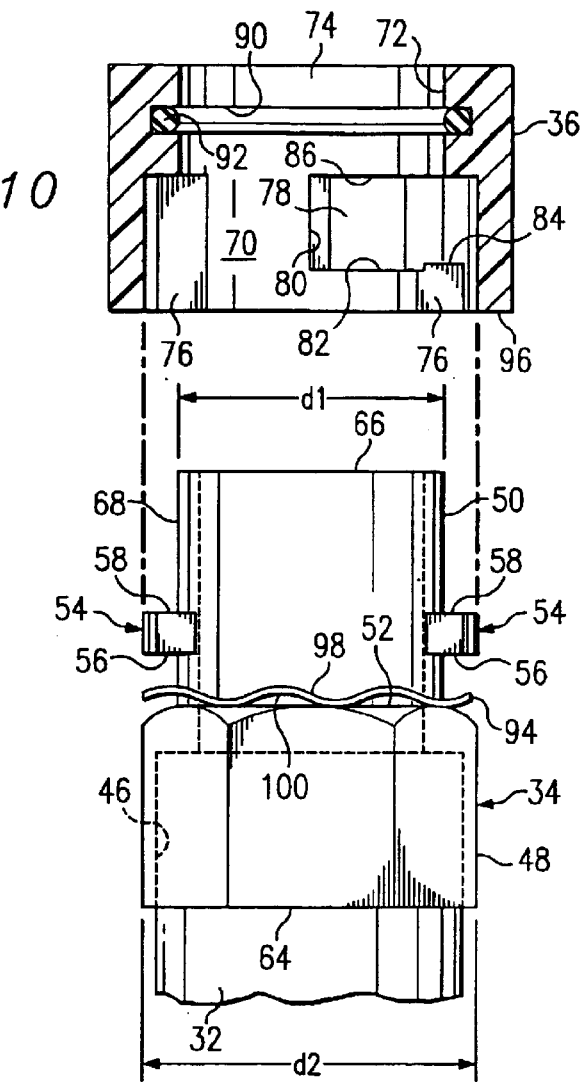
FIG. 10 is an exploded side view of the coupling device in accordance with the present invention, certain interior structure being shown in hidden line.

Referring to FIGS. 8–10, in the preferred embodiment, the male coupling 34 has a generally cylindrical shape 38 defining a hollow core 40 to be used as a fluid passageway and defining an axial direction or axis 'a'. The coupling 34 also includes a cylindrical first upper portion 42 that connects to the socket 36, and a second lower portion 44 that connects to the tube 32, preferably by welding or threaded connection (best seen in FIG. 10). The lower portion 44 has an inner cylindrical surface 46 and an outer hexagonal surface 48. The top portion 42 has an outer cylindrical surface or exterior side wall 50 with a diameter d1 smaller than the outer diameter d2 of the hexagonal surface 48 (shown in FIG. 10). The lower portion 44 has a ledge 52 extending from the outer surface 48 to the outer surface 50.

The inner diameters of the upper and lower portions are also different lengths to accommodate the sizes of the filter cartridge 24 and the fluid conduit 32. The fluid conduit 32 comes in a range of sizes from 1" to 6" outer diameter, but typically is provided with approximately 1½" outer diameter for both nuclear and fossil fuel applications, while the filter cartridges themselves are provided in the 2—2½" outer diameter range for all applications. The upper portion 42 of the adapter 34 typically has inner diameter of 1¼ to 1½" for filter cartridges 24 spaced within the filter vessel 12 at 3 to 3½" centers.

Figure 11:
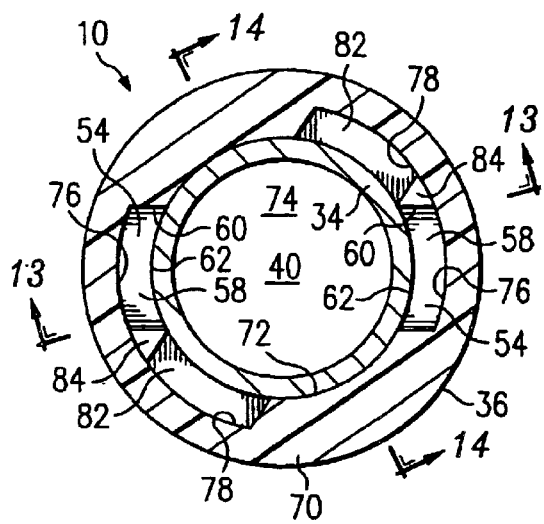
FIG. 11 is an assembled, top cross-sectional view taken substantially along the line 11—11 in FIG. 7.

Referring to FIGS. 8, 10 and 11, the adapter 34 has two diametrically opposed, radially extending tabs 54. The tabs 54 also extend laterally relative to the axial direction 'a' and are elongated circumferentially relative to the circumference of the outer surface 50. Each tab 54 has a lower flat engaging surface 56 and a corresponding opposing upper surface 58, both with nonzero widths 60 at an angle to the axial direction or axis 'a' while subtending a nonzero arc 62 about the axis 'a'. The engaging surface 56 also faces the end 64 of the adapter 34 attached to the fluid conduit 32 while the upper surface 58 faces the free end 66 of the adapter 34, both facing generally normal to the axis and preferably extending in planes perpendicular to the axial direction 'a'. In the preferred configuration, tabs 54 are welded to, or integrally formed with, the exterior 50 of the adapter 34 so that the core 40 is not blocked by any support mechanism for the tabs 54.

It will be appreciated that while tabs 54 are shown at diametrically opposite positions, many positions at angles to the axis 'a' are possible. Additionally, three, four or more tabs can be used rather than just the two tabs shown. For example, the use of more tabs may be indicated where greater axial force is to be withstood.

Referring again to FIG. 9, the exterior side wall 50 has a portion 68 that defines a first surface of rotation that fits within the socket 36. The surface of rotation 68 is provided with a smooth finish for slidably engaging a sealing member 92 as discussed below. Surface of rotation 68 is, in the illustrated embodiment, cylindrical, but could otherwise conform to conical, spherical, ellipsoidal or paraboloidal shapes, or other forms.

Referring now to FIGS. 10–14, the female coupling or socket 36 has a preferably cylindrical body 70 with an interior cylindrical surface or side wall 72 defining a hollow core 74 that provides a passageway for fluid and defines an axial direction or second axis 'a' in the general direction of flow through the socket 36.

In order to engage the tabs 54, the socket 36 has two opposing axially extending access channels 76 respectively continuous with two opposing, radially extending land channels 78, each of which has an opening 80 on the interior cylindrical surface 72 of the socket 36 for receiving the tabs 54.

The tabs 54 are received first by the access channels 76, which have a cross-section corresponding to, and slightly larger than, a periphery of each tab 54 so that the tab can slide axially through the access channel 76. The bottom surface of the land channel 78 is also a land 82 for mating with the engaging surface 56 of the tab 54. The land 82 has a predetermined, preferably flat, surface area and shape corresponding to the shape and size of the surface 56. The juncture of the access channel 76 and land channel 78 includes a raised triangular pad 84 to secure the tab 54 on the land 82 and from preventing the tab from sliding radially or counter-rotating off of the land 82. The top surface 86 of the land channel 78 may also act as a land when fluid forces the filter cartridge 24 toward the adapter 34.

The plastic material of the socket 36 is preferably made similar to other plastic parts of the filter cartridge 24 or other substantially nonmetallic material that can be shredded or incinerated along with the filter cartridge 24 when the filter cartridge purifies hazardous or radioactive material. It will be appreciated, however, when recycling or handling is not a concern, the socket could be made of metal, such as stainless steel, as long as it is strong enough to withstand the impact of axial forces distributed by the tabs 54.

While the upper end 88 (shown in FIG. 7) of the socket 36 is attached to the remainder of the filter cartridge 24 preferably by thermo-bonding, it may be attached by welding, chemical bonding, threading, pinning, or any other mechanical mechanism that provides an adequate seal between the remainder of the filter cartridge 24 and the socket 36 while permitting the core of the filter to communicate with the core 74 of the socket.

Figure 13:
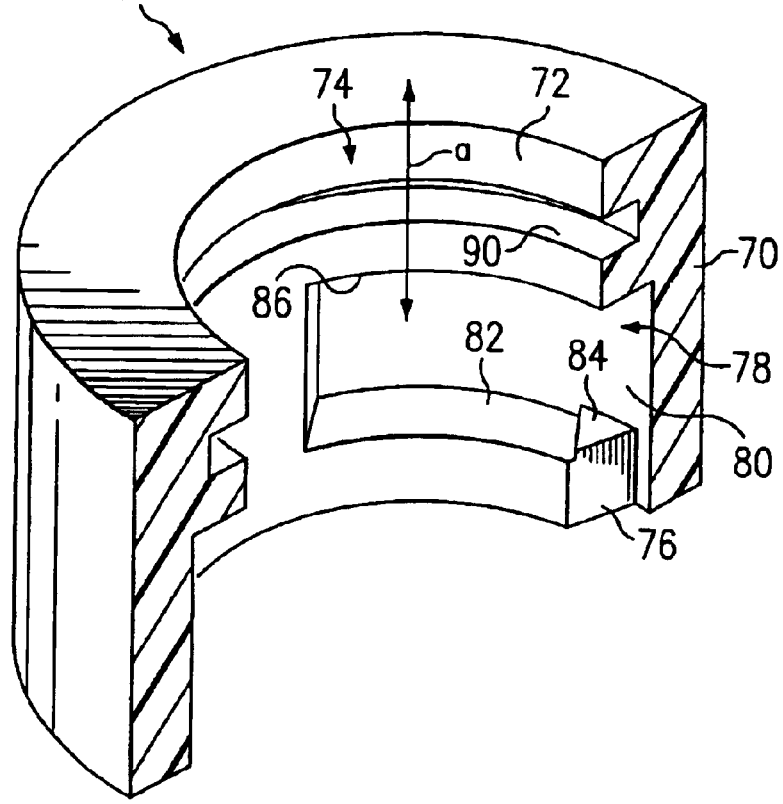
FIG. 13 is a top and side cross-sectional perspective view taken along the line 13—13 in FIG. 11 of a female coupling in accordance with the present invention.
Figure 14:
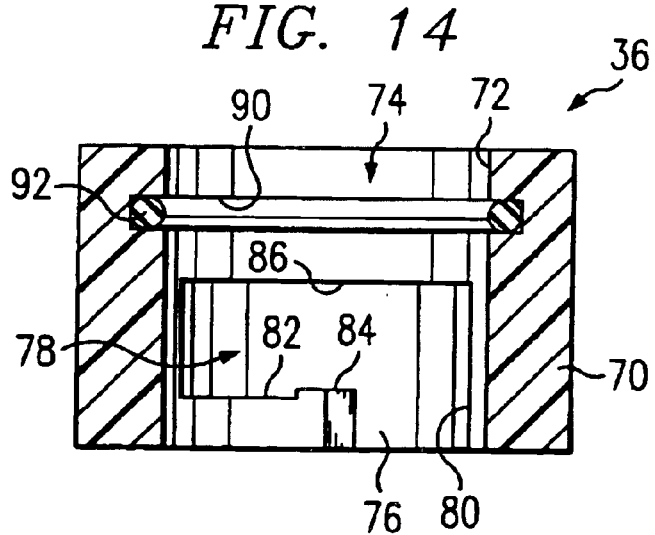
FIG. 14 is a cross-sectional side view along the line 14—14 in FIG. 11 of the female coupling in accordance with the present invention.

Referring to FIGS. 13–14, the socket 36 also has an annular groove 90 opening on the interior side wall or second surface of rotation 72. Second surface of rotation 72 matches first surface of rotation 68. A sealing member, such as an O-ring 92, fits snugly in the groove 90. When the coupling device 10 is assembled, the sealing member 92 engages the first surface of rotation 68 on the adapter 34, forming a tight seal that prevents unpurified material entering the core of the filter cartridge 24 and device coupling cores 40, 74.

Referring to FIGS. 7 and 10, the coupling device 10 includes a biasing or elastic member such as a wavy washer 94. The biasing member 94 creates an axial force that biases the socket 36, and in turn the filter cartridge 24, up and away from the adapter 34 and fluid conduit 32. The axial force is distributed on the areas of the lands 82 and the engaging faces 56 of the tabs 54. This configuration maintains the tabs 54 against the lands 82 for locking the filter cartridge 24 in place. However, a coil spring, leaf spring or any other biasing device that biases the socket 36 upward and away from the adapter 34 can be used.

The wavy washer 94 is mounted around the upper portion 42 and disposed between the ledge 52 and a bottom edge 96 of the socket 36 so that when assembled a top side or surface 98 of the washer 94 abuts the bottom edge 96 and a bottom side or surface 100 of the washer abuts the ledge 52. The use of the ledge 52 eliminates the need for an additional piece to mount the biasing member 94 on the adapter 34.

Referring to FIGS. 6, 10 and 11, to mount the filter cartridges 24 on the fluid conduits 32, the adapters 34 are preferably previously and permanently attached to the fluid conduits during the construction of the tube sheet 22 and filter vessel 12. From a top opening in the tank (not shown), the filter cartridges 24 are inserted into the filter vessel by grasping the top ends of the filter cartridges opposite the ends with the sockets 36, lining up the access channels 76 on the socket 36 with the tabs 54 on the adapters 34, and then axially engaging the socket with the adapter 36 by lowering the filter cartridge and socket.

Figure 12:
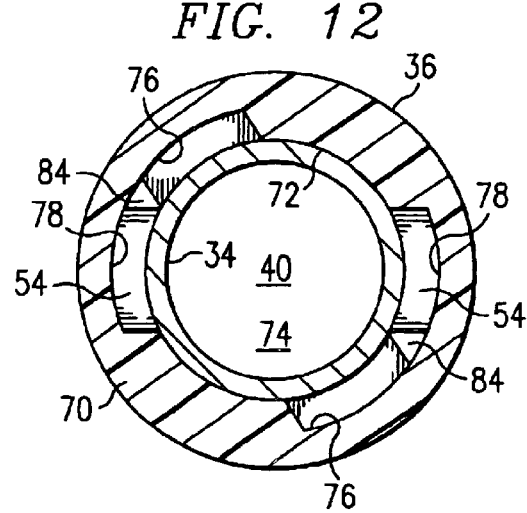
FIG. 12 is an assembled, top cross-sectional view taken substantially along the line 12—12 in FIG. 7 showing a socket twisted sixty degrees clockwise upon the adapter.

The filter cartridge 24 and socket 36 are lowered so that the tabs 54 slide axially through the access channels 76 in the socket (best seen in FIG. 11). Pressure is applied to overcome the force of the wavy washer 74 until the socket 36 will not downwardly displace any farther. In this position, the tab 54 is in line with the land channel 78 and clear of the pad 84. To place the tabs 54 on the corresponding lands 82, the filter cartridge 24 is preferably rotated only ⅙ a full rotation as shown in FIG. 12. It will be appreciated, however, that the design can accommodate up to a maximum of ¼ turn for full engagement or disengagement. The filter cartridge 24 is grasped by hand, robotic mechanism, wrench or other device as known in the art for twisting or turning the filter cartridge 24 and engaging the couplings.

Releasing the hold on the cartridge 24 allows the wavy washer 94 to push the filter cartridge 24 upward, which locks each tab 54 on a corresponding land 82. In the preferred embodiment, at rest the washer 94 exerts an axial force of approximately 20 pounds, which is distributed by the tabs 54.

Referring again to FIGS. 6–7, during normal operation, fluid flowing into the filter vessel 12 from the inlet 14 flows through filter 30 purifying the fluid. The fluid then flows through the core of the filter cartridge 24, down through the socket 36 and adapter 34, into the fluid conduit or tube 32 and the plenum 20, and finally out of the filter vessel 12 through outlet 16.

During backwashing operations, the fluid flows in the reverse of the normal operation, which causes the filter cartridge 24 and socket 36 to be pulled upward by the fluid. This causes the axial forces from the fluid to add to the axial force generated by the wavy washer 94 so that the lands 82 in the socket 36 can press against the tabs 54 with strengths totaling approximately 70 pounds. Since the tabs 54 spread this axial force laterally throughout the flat mating surface 56 or 58 of the tab 54, the force is distributed so that the thermoplastic material of the socket 36 is not ripped through or sheared off.

It will be appreciated that many alternative configurations fall within the scope of the present invention contemplated by the inventors. For instance, the filter cartridges 24 may hang down from an upper tube sheet 32. Additionally, a filter-side coupling may be a polymeric adapter or male coupling instead of the female coupling while a steel socket may be permanently attached to the fluid conduit as the conduit-side coupling.

Both incineration and shredding are used in processing radioactive waste for purposes of volume reduction. Incineration provides the maximum volume reduction, but requires the added expense of containment of combustion products. Landfilling of radioactive waste is not permitted under present laws. Consequently, radioactive waste must be contained in secure containers in a monitored storage facility for the foreseeable future, which is extremely expensive.

The many advantages of this invention are now apparent. A coupling device 10 has a polymeric socket 36 that can be incinerated or shredded along with other parts of the filter cartridge 24 for recycling after the socket 36 is used in hazardous or radioactive material processes. Incineration and shredding reduces volume of radioactive material which must be contained in secure containers at monitored storage facilities because landfilling of radioactive material is not permitted under current law. In addition, this type of recyclable and shreddable material is safer to the environment than landfill operations which require long periods of time to reuse radioactive material and large land areas where radiation can escape from.

Also, an adapter 34 has tabs 54 designed to spread an axial force laterally, by providing a generally flat predetermined surface area 56 or 58 on the tabs 54 for impacting a land 82 on the socket 36 so the full force is not directed to a single point on the socket 36. The tabs 54 and channels 76, 78 are configured so that only a single twist of ¼ to ⅙ a rotation is needed to fully engage the socket 36 on the adapter 34.

While various embodiments of the present invention have been shown and described, it should be understood that other modifications, substitutions and alternatives can be made without departing from the spirit and scope of the invention, which should be determined from the appended claims.

What is claimed is:

1. A coupling device for fuels or radioactive fluids for connecting a filter element to a fluid conduit, comprising:
   a polymeric filter-side coupling attached to said filter element;
   a metal conduit-side coupling attached to said fluid conduit and engaging said filter-side coupling;
   a selected one of said filter-side coupling and said conduit-side coupling having at least two radially projecting tabs, and the corresponding other said coupling having lands for receiving said tabs,
   wherein said filter-side coupling defines an axial direction parallel to a direction of fluid flow through said coupling device and receives an axial force causing said lands and said tabs to press toward each other, and
   wherein said filter-side coupling has either said lands or said tabs being configured for distributing said axial force laterally relative to said axial direction and generally through out said land or said tab so that said filter-side coupling is not damaged.

2. The coupling device according to claim 1, wherein said conduit-side coupling is stainless steel.

3. The coupling device according to claim 1, wherein said lands are generally flat and said tabs have generally flat surfaces for engaging said lands, said flat surfaces having predetermined surface areas for distributing said axial force throughout said flat surfaces.

4. The coupling device according to claim 3, wherein said coupling with said tabs defines an outer cylindrical surface having a circumference, and wherein said tabs are generally elongated along said circumference.

5. The coupling device according to claim 3, wherein said flat surfaces are generally normal to said axial direction.

6. The coupling device according to claim 1, wherein said lands of said female coupling generally extend in planes perpendicular to said axial direction.

7. The coupling device according to claim 1, wherein said tabs and said lands are configured and disposed on said couplings so that one said coupling is stationary and the other said coupling is rotated at most approximately ⅙ of a full rotation on said stationary coupling to fully engage said lands on said tabs.

8. A coupling device for fuels or radioactive fluids for connecting a filter element to a fluid conduit, comprising:
   a metal male coupling secured to one of said fluid conduit and said filter element, said male coupling having at least two radially projecting tabs; and
   a polymeric female coupling engaged with said male coupling for securing said filter element on said fluid conduit, said female coupling having lands for receiving said tabs,
   said male and female couplings each having a passageway for fluid, said passageways defining an axial direction,
   each said tab being configured for distributing an axial force generally throughout said tab and laterally relative said axial direction so that either of said land being forced against said tab or said tab being forced against said land does not damage said female coupling and said filter element remains secured to said fluid conduit,
   wherein said male coupling has a first portion with an outer surface having a first outer diameter configured for fitting within said female coupling and a second portion configured for securing onto said fluid conduit and having a second outer diameter larger than said first outer diameter, and a ledge connecting said first and second outer diameters; and
   the coupling device further comprising a biasing means disposed on said ledge for biasing said land toward said tab,
   wherein said axial force is at least partially formed by said biasing means.

9. The coupling device according to claim 8, wherein said female coupling includes a bottom edge, and wherein said biasing means has two opposing sides and is disposed between said bottom edge and said ledge so that said biasing means abuts said ledge on one said side and abuts said bottom edge on the other side.

10. The coupling device according to claim 8, wherein said biasing means is a wavy washer mounted around said first portion and on said ledge.

11. A coupling device for fuels or radioactive fluids for connecting a filter element to a fluid conduit, comprising:
   a metal male coupling secured to one of said fluid conduit and said filter element, said male coupling having at least two radially projecting tabs; and
   a polymeric female coupling engaged with said male coupling for securing said filter element on said fluid conduit, said female coupling having lands for receiving said tabs,
   said male and female couplings each having a passageway for fluid, said passageways defining an axial direction,
   each said tab being configured for distributing an axial force generally throughout said tab and laterally relative said axial direction so that either of said land being forced against said tab or said tab being forced against said land does not damage said female coupling and said filter element remains secured to said fluid conduit,
   wherein said male coupling has a first portion with a first surface of rotation, and said female coupling has a second surface of rotation opposing said first surface of rotation, said surfaces of rotation defining where said female coupling receives said male coupling; and
   the coupling device further including a sealing element disposed between said first and second surfaces of rotation so that unfiltered material cannot enter said fluid conduit.

12. The coupling device according to claim 11, wherein said sealing element is an O-ring.

13. A coupling device for attaching a filter element to a fluid conduit, comprising:
   a male coupling formed around a first axis and having an attached end, a free end, an exterior side wall between the attached end and the free end, and a hollow core disposed interiorly of the exterior side wall, a portion of the exterior side wall adjacent the free end formed as a first surface of rotation, a plurality of tabs extending outwardly from said portion of the exterior side wall and angularly spaced apart from each other with respect to the first axis, each tab having an engaging face facing the attached end, said engaging face having a nonzero width at an angle to the first axis and subtending a nonzero arc about the first axis, the attached end being attached to a first pre-selected one of the filter element and the fluid source;
   a female coupling formed of a polymeric material around a second axis and having an attached end, a free end, an interior side wall formed between the attached end and the free end, a portion of the interior side wall adjacent the free end formed generally as a second surface of rotation matable to the first surface of rotation, a plurality of access channels formed in the interior side wall from the direction of the free end of the female coupling and longitudinally extending toward the attached end thereof, each access channel adapted to receive a respective tab of the male coupling element and having an end opposite said free end which terminates in a groove formed in the interior side wall which extends at an angle from the respective access channel and subtending a predetermined arc with respect to the second axis, a land of the groove facing the attached end of the female coupling adapted to receive a respective one of said engaging faces of the tabs, the land having an area, the attached end of the female coupling attached to a second pre-selected one of the filter element and the fluid conduit; and
   means for axially biasing the filter element relative to the fluid conduit such that an axial force is created pushing the filter element away the axial from the fluid conduit, the axial force being distributed on the areas of the lands and on the engaging faces of the tabs.

14. A coupling device for connecting a filter element to a fluid conduit, comprising:
   a male coupling secured to one of said fluid conduit and said filter element, said male coupling having at least two radially projecting tabs; and
   a polymeric female coupling engaged with said male coupling for securing said filter element on said fluid conduit, said female coupling having lands for receiving said tabs,
   said male and female couplings each having a passageway for fluid, said passageway defining an axial direction,
   each said tab being configured for distributing an axial force generally throughout said tab and laterally relative said axial direction so that either of said land being forced against said tab or said tab being forced against said land does not damage said female coupling and said filter element remains secured to said fluid conduit, wherein said male coupling has a first portion with an outer surface having a first outer diameter configured for fitting within said female coupling and a second portion configured for securing onto said fluid conduit and having a second outer diameter larger than said first outer diameter, and a ledge connecting said first and second outer diameters, and the coupling device further comprising a biasing means disposed on said ledge for biasing said land toward said tab, wherein said axial force is at least partially formed by said biasing means.

* * * * *